United States Patent

[11] 3,630,534

| [72] | Inventor | Bernard R. Better |
| | | Chicago, Ill. |
| [21] | Appl. No. | 2,220 |
| [22] | Filed | Jan. 12, 1970 |
| [45] | Patented | Dec. 28, 1971 |
| [73] | Assignee | The Bendix Corporation |

[54] POLYGON TWIST LOCK TOOLHOLDER
11 Claims, 7 Drawing Figs.

[52] U.S. Cl.................................................. 279/1 T,
90/11 A, 279/102
[51] Int. Cl........................................................ B23b 31/10
[50] Field of Search............................................. 279/102,
103, 1 A, 1 L, 1 T, 71, 81, 83, 28, 29, 30, 73; 90/11 A

[56] References Cited
UNITED STATES PATENTS

| 893,960 | 7/1908 | Weaver | 279/71 X |
| 2,128,116 | 8/1938 | Boone | 279/83 |
| 2,397,382 | 3/1946 | Smith | 279/102 X |

*Primary Examiner*—Andrew R. Juhasz
*Assistant Examiner*—James F. Coan
*Attorney*—Plante, Hartz, Smith & Thompson

ABSTRACT: A toolholder of the type having a polygonal bore designed to cooperate with a similarly shaped tool shank to cause these members to wedge together by the torque generated during machining operations to produce a centering action as well as a frictional gripping force between the holder and the tool, featuring a torque preloading arrangement increasing and redistributing the wedging forces created during machining operations.

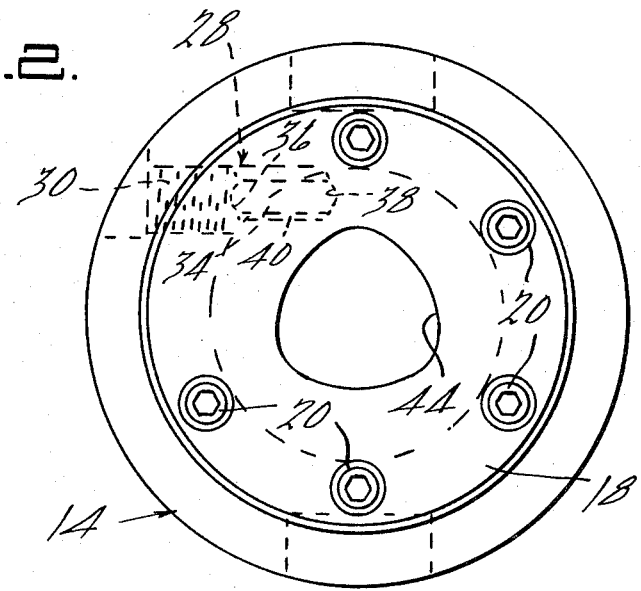
FIG.2.
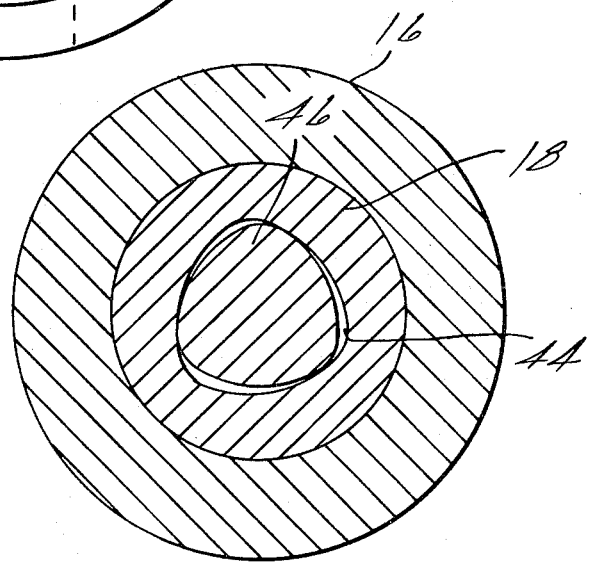
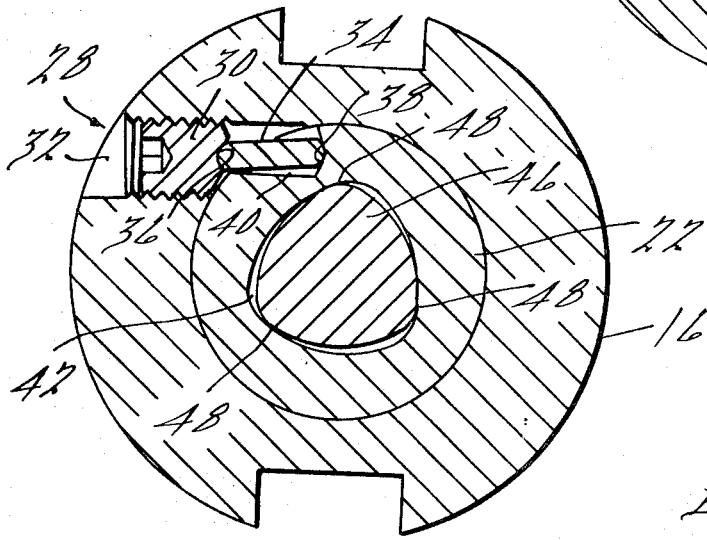
FIG.3.
FIG.4.
INVENTOR.
Bernard R. Beffer
BY
John R. Benefiel
ATTORNEY

POLYGON TWIST LOCK TOOLHOLDER

BACKGROUND OF THE INVENTION

A great increase in the use of automatic tool-changing machine tools used with numerical controls has brought forth an increasing emphasis on the use of end-mounted tools, adapters, accessories, etc., since it would be difficult to adapt such machine tools to implements requiring end supports. In addition, these tools often must be "preset" or located axially for such applications, hence requiring straight-shanked tools, as distinguished from tapered shank or other nonuniform shank shapes which necessitate the use of special adapters in order to provide the axial adjustment referred to.

Any such toolholder should provide accurate centering of the tool and holder with economically attainable production tolerances, a secure driving connection therebetween, rigid tool support and should allow axial adjustment and simple, low-effort installation and removal.

These requirements are largely met by the polygon drive, in which the tool shank and the mating hole are substantially shaped as corresponding polygons. This arrangement allows a comparatively loose fit between the members, but upon initial cutting action the torque experienced by the tool causes a slight relative rotation, in turn causing the members to be wedged together. This wedging action produces several beneficial results: the tool and toolholder are centered with respect to each other due to the geometry of the forces, and this centering action is relatively insensitive to dimensional variation as a result of wear or manufacturing tolerances; a positive drive is established; the wedging action creates frictional gripping forces on the tool, retaining the tool against axial pullout.

Notwithstanding that gripping forces are inherently present, additional measures must ordinarily be taken since pullout forces generated during cutting with high helix angle end mills may sometimes exceed the axial gripping forces generated. In addition, it may be preferably to have the tool axially positioned by gripping forces before the start of the cutting operation in order to provide a convenient means for aiding in presetting.

The solutions to this problem have usually involved the use of set screws cooperating with flats, cams, tightening collars, positive locks, etc., all involving discontinuities in the tool shank and some creating unbalanced loading and/or bending or the tool shanks. These devices, in addition to eliminating the advantages of the straight-shanked tool, also may cause burring of the contact areas and are more difficult to balance for high-speed operations.

Another approach to the problem has been the use of a hydraulic grip with the polygon drive, such approach being the subject of U.S. application Ser. No. 732,408 filed May 27, 1968, and assigned to the same assignee as the present application. However, the simplicity of a purely mechanical design has much to recommend it.

In addition, both of these general approaches do not involve significant preloading of the wedging surfaces, which, it has been found, provides special advantages to be described herein.

Therefore, it is an object of the present invention to provide in a wedge action toolholder a supplementary gripping arrangement which does not necessarily require a discontinuity in the tool shank, acts evenly thereon, and which possesses certain other advantages which will hereinafter be described.

SUMMARY OF THE INVENTION

This object and others which will become apparent upon a reading of the specification and claims are accomplished by providing an initial torque between the holder and the tool in order to produce a "preload" wedging, such torque being preferably applied at the opposite end of the tool shank from the tool bit.

DESCRIPTION OF THE DRAWINGS

FIG. 2 is an end view of the assembly shown in FIG. 1, shown without the tool.

FIG. 3 is a view of the section taken along the line 3—3 in FIG. 1.

FIG. 4 is a view of the section taken along the line 4—4 in FIG. 1.

FIG. 5 is a graphical representation of the wedging and frictional force levels existing down the length of the tool shank as a result of the torque preload.

FIG. 6 is a graphical representation of the wedging and frictional force levels existing down the length of the tool shank as a result of the torque reaction caused by the cutting activity.

FIG. 7 is a graphical representation of the wedging and frictional force levels existing down the length of the tool shank as a result of the combined effects of the torque preload and the cutting action.

DETAILED DESCRIPTION

Figure 1:
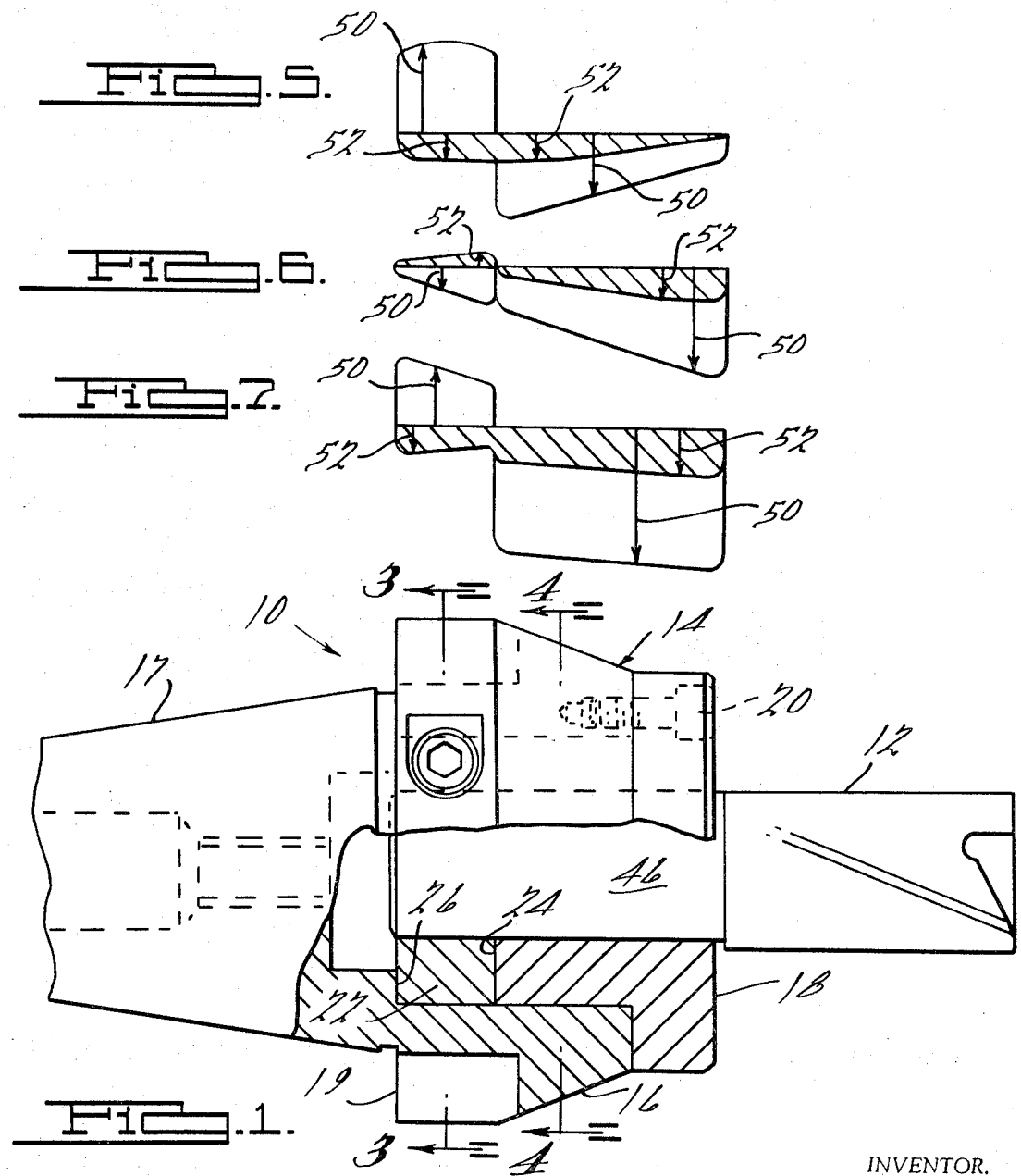
FIG. 1 is a view in partial section of a toolholder according to the present invention shown with a tool installed and connected to an adapter member.

In the following detailed description of a preferred embodiment of the invention, certain specific terminology will be used for the sake of clarity, but it is to be understood that the invention is not to be so limited, and may be practiced in a great variety of forms and variations.

Referring to the drawings and particularly to FIG. 1, 10 indicates the complete assembly, including the tool 12 and the toolholder assembly 14, which includes an adapter 16 having a tapered end portion 17.

The tool 12 is shown as an end mill, but of course the toolholder 14 may be used to grip any type of tool, adapter, or other accessory as well.

Similarly, the adapter 16 is shown with a tapered end portion to form a drive connection with spindles designed for this configuration, but any type is useable with the present invention, such as a flange drive, adapted to be bolted to a mating flange connected to the spindle face. The spindle may also be designed so as to be integral with the toolholder, eliminating the need for an adapter.

The toolholder assembly 14 is this particular embodiment includes a polygon bushing 18 which is secured by machine screws 20 to the adapter 16 and a locking ring 22, located axially between the bushing end 24 and abutment 26 formed in the adapter 16.

An actuator assembly 28 (FIGS. 2 and 3) is provided in order to apply a turning force to the locking ring 22 relative to the bushing 18. This assembly includes an actuator screw 30 threadedly engaging a bore 32 in the bushing 18, and an equalizing pin 34 disposed engaging a cavity 36 in the actuator screw 30 and a cavity 38 formed in slot 40 machined into the locking ring 22. The equalizing pin 34 allows for changes in the line of action force exerted by the actuating screw 30 as the locking ring 22 rotates and avoids shifting of the contact point between the actuator screw 30 and the locking ring 22 which would occur if the actuator screw alone were used. (See FIGS. 2 and 3).

Both the locking rings 22 and the polygon bushing 18 are formed with polygon bores 42 and 44 designed to cooperate with the tool shank 46, formed with a corresponding polygon shape.

The design and the theory of the polygon drives is well known in the art and it is not felt necessary to describe this in detail here.

Suffice it to say, as can be seen in FIGS. 3 and 4, when the shank 46 rotates into contact with the bores 42 and 44, a wedging takes place which creates a positive drive therebetween, as well as a compressive force component creating a frictional engagement to provide gripping of the tool and in addition a centering action due to the symmetry of the forces with respect to the centerlines of the respective elements.

It should also be noted that the term "polygon" is not used to signify solely a precise geometrical polygon, since the sharp corners would create line rather than area contact, leading to excessive contact pressures as well as other disadvantages. Hence, the polygon corners and sides are well rounded as lobes 48, as illustrated, in the manner known in the prior art. In this regard, the use of four or more lobes is also possible, although the three-lobed configuration appears particularly advantageous because the bores 42 and 44 may be precision ground and the wedging forces generated by a given torque level are higher.

OPERATION

In use, the tool shank 46 is inserted into the bores 42 and 44, and actuator screw 30 is advanced until the lobes 48 of the shank engage the bore 42 of the locking ring 22 as shown in FIG. 3. Continued advance of the actuator screw 30 rotates the shank lobes 48 into contact with the bore 44, after which wedging forces build up between the bore 42 and 44 and the tool shank 46.

As represented graphically in FIG. 5, these wedging forces 50 and the frictional gripping forces 52 (shown shaded) are roughly constant over the width of the locking ring 22, then decrease form a maximum at the edge of the polygon bushing 18 abutting the locking ring 22 to a minimum at the far edge, adjacent the free end of the tool 12.

Since the wedging forces are exerted on opposite sides of the lobes 48 in the locking rings, and the bushing 18, they are represented as positive and negative forces respectively in these diagrams, and as the compressive or gripping forces are directed inwardly on both elements, they are represented therein as having the same sign.

During a cutting operation, wedging and frictional forces are also generated from the resistance of the work to the machining operation. These forces are directed so as to increase the wedging engagement between the tool shank 46 and the bore 44. As depicted in FIG. 6, these forces are a maximum at the edge nearest the tool bit or free end and decline to a minimum at the opposite end. On the other hand, these forces tend to unload the locking ring 22 as indicated.

The net effect of these forces, as depicted in FIG. 7, is much higher frictional engagement forces, which are also distributed more uniformly down the length of the tool shank 46, allowing full utilization of the contact area involved.

Hence, it can be appreciated that a much higher gripping force is generated which will act to prevent tool pullout in response to the axial reaction forces described infra.

It should also be noted that providing the bore 42 with a wedging relationship with the tool shank 46, and retaining the locking ring 22 against axial movement relative to the abutment 26 of the adapter 26 and the bushing end 24 allows the gripping forces generated to contribute to the holding forces between the tool shank 46 and the bushing 18 tending to resist tool pullout.

In addition, it has been found that the preload of the contact surfaces insures that sufficient pressure exists to prevent "microslip," which is very slight relative movement between the mating parts under the influence of the torque fluctuation produced during the cutting reaction torque when gripping forces are low, which in turn prevents fretting corrosion—a result of the presence of "microslip" which can destroy the original accuracy of the mating parts. Conventional holding arrangements, while increasing the gripping forces, do not provide these increased wedge forces, and hence do not aid in the solution of this problem.

These results have been obtained with a simple arrangement that does not necessarily require the matching of flats or special cam surfaces on the tool shank, nor does it impose unequal or bending loads thereon, nor does it produce burring upset of the shank surface.

Furthermore, only a minimal effort is involved on the part of the operator, and presetting arrangements may be easily incorporated into the assembly.

While a specific embodiment has been described in order to aid in a complete understanding of the invention, it should be understood that the invention may be practiced in a variety of other forms without departing from the spirit of the appended claims. Along this line, the torque preload could be produced by another arrangement than that shown. For example, the locking ring member 22 could be eliminated in favor of setscrews carried by the holder and engaging flats on the polygon along a line of action eccentric to the axis of the tool, so as to produce the torque preload. On the other hand, some means, other than the polygon drive of creating the wedge action could also be used.

What is claimed is:

1. A toolholder for holding a member to be driven comprising:
   a toolholder assembly;
   wedging means creating a wedging connection between said member held and said toolholder assembly in response to torque generated by driving of said member by said toolholder assembly; and
   preload means for creating a torque preload between said toolholder and said member, whereby the wedging forces produced by the machining operation are increased.

2. The toolholder of claim 1 wherein said preload means includes means applying a torque to the member held at a point along the portion of the member engaged by the toolholder assembly opposite a free end of the member, whereby the wedging forces created by said preload means and the driving operation are more uniformly distributed along the portion of the member engaged by the toolholder assembly.

3. The toolholder of claim 1 wherein the wedging means includes a bushing carried by said toolholder assembly and having a bore therein shaped to receive said member and to create a wedging action upon relative rotation therebetween and wherein said preload means includes a locking element and means rotating said member in response to rotation of said locking element, and further includes actuation means for rotating said locking element relative to said bushing, whereby said member may be rotated into wedging engagement with said bushing upon rotation of said locking element relative to said bushing.

4. The toolholder of claim 3, wherein said means to rotate said member by said locking element includes a bore in said locking element shaped to create a wedging action between said locking element and said member, and wherein said toolholder also includes means retaining said locking element, against axial movement relative said bushing, whereby the gripping forces created by wedging between said locking element and said member contribute to the action of the gripping force between said bushing and said member in preventing axial movement of said member relative to said bushing.

5. The toolholder of claim 3 wherein said means rotating said member in response to rotation of said locking element acts on a portion of said member extending beyond said bushing bore opposite the free end of said member, whereby the wedging forces between said bushing and said member created by said locking element and the wedging forces created by the driving operation tend to produce uniform wedging forces across the portion of the member engaging said bushing.

6. The toolholder of claim 3 wherein said actuation means includes an actuation screw drivingly connected to said bushing, and also includes a reaction pin engaging said actuation screw and said locking element.

7. A toolholder for connecting a polygonal shank tool member to a machine spindle comprising:
   a bushing formed with a substantially polygonal bore therein;
   means for securing said bushing to said machine spindle;
   a locking ring having a polygonal shaped bore matching said bushing bore;
   means positioning said locking ring with said bores aligned;

means for rotating said locking ring relative to said bushing, whereby said locking ring will wedge said tool member into engagement with said bushing and provide preloading of said bushing and said member.

8. The toolholder of claim 7 further including means retaining said locking ring against axial movement relative said bushing whereby said ring wedging forces aid in holding said tool member in said toolholder.

9. The toolholder of claim 7 wherein said locking ring is located on the spindle side of said bushing, whereby the wedging forces are more uniformly distributed down the shank of the tool member.

10. A toolholder for connecting a polygon shank tool member to a machine spindle comprising:

an adapter member having an opening formed therein;

a bushing formed with an internal polygonal opening and having a portion disposed in said adapter opening;

means connecting said bushing and said adapter member;

a locking ring having an internal polygonal opening corresponding to said bushing opening, located in said adapter opening and axially abutting said bushing on one side and said adapter on the other, and with said internal opening aligned with said bushing internal opening;

actuating means for rotating said locking ring relative to said bushing.

11. The toolholder of claim 10 wherein said actuating means includes a screw element threadedly engaging said adapter, and further includes a reaction pin disposed engaging said screw element and said locking ring.

* * * * *